(12) United States Patent  
Imbert et al.

(10) Patent No.: US 12,654,669 B2  
(45) Date of Patent: Jun. 16, 2026

(54) METHOD FOR CALIBRATING AN ACQUISITION CHAIN OF A BRAKING DEVICE OR BRAKING SYSTEM OF AT LEAST ONE VEHICLE, IN PARTICULAR AT LEAST ONE RAILWAY VEHICLE

(71) Applicant: FAIVELEY TRANSPORT ITALIA S.P.A., Piossasco (IT)

(72) Inventors: Luc Imbert, Turin (IT); Matteo Frea, Cantalupa (IT); Stefano Lucarelli, Turin (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 528 days.

(21) Appl. No.: 18/260,759

(22) PCT Filed: Jan. 11, 2022

(86) PCT No.: PCT/IB2022/050179  
§ 371 (c)(1),  
(2) Date: Jul. 7, 2023

(87) PCT Pub. No.: WO2022/153173  
PCT Pub. Date: Jul. 21, 2022

(65) Prior Publication Data  
US 2024/0059266 A1 Feb. 22, 2024

(30) Foreign Application Priority Data  
Jan. 12, 2021 (IT) ........................ 102021000000428

(51) Int. Cl.  
*B60T 17/22* (2006.01)  
*B60T 8/172* (2006.01)

(52) U.S. Cl.  
CPC ............ *B60T 17/221* (2013.01); *B60T 8/172* (2013.01); *B60T 17/228* (2013.01)

(58) Field of Classification Search  
CPC ...... B60T 17/221; B60T 8/172; B60T 17/228; B60T 2250/06; B60T 8/1705; B60T 8/885; B60T 13/662  
See application file for complete search history.

(56) References Cited

U.S. PATENT DOCUMENTS 8,255,136 B2 * 8/2012 Bentner ................. B60T 7/107  
701/70  
2011/0071744 A1 3/2011 Ono et al.  
(Continued)

FOREIGN PATENT DOCUMENTS

DE 102017215625 A1 3/2019  
EP 3455111 B1 3/2020  
(Continued)

OTHER PUBLICATIONS

ISA European Patent Office, International Search Report Issued in Application No. PCT/IB2022/050179, Apr. 7, 2022, WIPO, 2 pages.

*Primary Examiner* — Manuel A Rivera Vargas  
(74) *Attorney, Agent, or Firm* — K&L Gates LLP

(57) ABSTRACT

A method is described for calibrating an acquisition chain of a braking device or system of at least one vehicle, in particular at least one railway vehicle, which method includes the steps of:

a) measuring a predetermined reference value of a physical quantity by means of a calibration means having a degree of accuracy greater than a predetermined threshold;

b) measuring the predetermined reference value of the physical quantity by means of the acquisition chain;

c) determining a measurement error therebetween; and d) modifying the at least one coefficient of said transfer function of control means of the acquisition chain, on the basis of the comparison of the value measured by the calibration means with the value measured by the (Continued)

acquisition chain, so that the measurement error of the acquisition chain is minimized or rendered null.

14 Claims, 5 Drawing Sheets

(56) References Cited

U.S. PATENT DOCUMENTS

| | | | | |
|---|---|---|---|---|
| 2016/0221563 | A1 | 8/2016 | Reynolds | |
| 2019/0001822 | A1* | 1/2019 | Tione | B60L 3/106 |
| 2019/0299954 | A1* | 10/2019 | Wein | B60T 8/172 |
| 2020/0047760 | A1* | 2/2020 | Svensson | B60W 10/00 |
| 2020/0282965 | A1* | 9/2020 | Pieronek | H04L 12/40 |

FOREIGN PATENT DOCUMENTS

| | | | |
|---|---|---|---|
| WO | 2017194512 | A1 | 11/2017 |
| WO | 2019048261 | A1 | 3/2019 |

* cited by examiner

METHOD FOR CALIBRATING AN ACQUISITION CHAIN OF A BRAKING DEVICE OR BRAKING SYSTEM OF AT LEAST ONE VEHICLE, IN PARTICULAR AT LEAST ONE RAILWAY VEHICLE

CROSS REFERENCE TO RELATED APPLICATIONS

The present application is a U.S. National Phase of International Application No. PCT/IB2022/050179 entitled "METHOD FOR CALIBRATING AN ACQUISITION CHAIN OF A BRAKING DEVICE OR BRAKING SYSTEM OF AT LEAST ONE VEHICLE, IN PARTICULAR AT LEAST ONE RAILWAY VEHICLE," and filed on Jan. 11, 2022. International Application No. PCT/IB2022/050179 claims priority to Italian Patent Application No. 102021000000428 filed on Jan. 12, 2021. The entire contents of each of the above-listed applications are hereby incorporated by reference for all purposes.

TECHNICAL FIELD

This invention lies generally in the field of calibration systems for vehicles, in particular railway vehicles, in particular, the invention relates to a method for calibrating an acquisition chain of a braking device or braking system of at least one vehicle, in particular at least one railway vehicle.

PRIOR ART

The prior art will be described below with particular reference to the field of railway vehicles. What will be described also applies, where possible, to vehicles in other fields.

Over the last 50 years, braking systems, for example for railway vehicles, have changed from pneumatic systems to electropneumatic systems (the same applies to hydraulic and mechanical systems). As a result of this change, it is increasingly necessary to rely on control measurements which make it possible to monitor the force applied by these braking systems.

The change from pure pneumatics to electropneumatics has brought numerous advantages, such as greater precision and a reduction in weight and volume.

In addition to this change in type of system, the vehicle manufacturers' accuracy requirements for the braking distance have changed, thus also changing the accuracy requirement for the pressure in a braking cylinder of a braking system. The pressure accuracy in the braking cylinder was previously +/−250 mbar. Nowadays, the braking cylinder accuracy is +/−100 mbar in the cylinder.

The braking accuracy and thus the precision of the braking distance were previously ensured by manually calibrating the various pneumatic components of a braking system. For example, these components could include a VCAV (empty-loaded valve, from the French 'vide-chargé auto-variable'), an LPV (load proportional valve), or a distributor.

The calibration method consisted in measuring the pressure of the braking cylinder for a given load pressure and verifying that the pressure of the braking cylinder satisfied a predetermined transfer function. When this pressure was lower or higher than the provided value, also taking into consideration a positive or negative deadband interval (+/−), the mechanical object being calibrated was physically calibrated and this calibration was recorded in a suitable maintenance file.

Throughout the life cycle of the braking system, the mechanical subassembly/mechanical parts are subjected to wear, vibrations and temperature fluctuations that in turn create micro/macroscopic changes therein. These changes affect the performance of the subassembly or the mechanical part. These changes may increase or decrease the pressure in the cylinder of the brake. This variation in pressure in the brake cylinder might not allow the braking system to guarantee the safe braking distance normally provided. In view of this drawback, the calibration explained above was carried out.

With regard to the electronic components of electropneumatic braking systems, for example, the electronic sensors have an initial manufacturer's precision offset and may drift according to time, use, temperature fluctuations and the magnitude of change in the measured value. The properties of the electric circuit which reads the outlet of the sensor also vary according to similar factors. All of these factors led to a decrease in the accuracy of an acquisition chain, thus decreasing the accuracy and precision of the emergency and service braking functions.

Disadvantageously, the calibration methodology used for pneumatic systems may not be used for electropneumatic systems, because electropneumatic systems are not solely composed of purely mechanical parts and subassemblies.

WO2017194512A1, for example, describes a method and a braking system able to carry out automatic calibration on the basis of the filling and discharge times of the cylinders, and not on the basis of absolute pressure values. Nevertheless, it is not able to resolve the problem of maintaining the braking precision of the electropneumatic braking system.

In another example, WO2019048261A1 describes a braking device which incorporates an observer and a model which estimate the pressure of the cylinder on the basis of the outlet pressure of a device for regulating the pressure. The problem of maintaining the braking precision of the electropneumatic braking system is not addressed in this case either.

A new calibration technique is therefore necessary.

SUMMARY OF THE INVENTION

The object of this invention is therefore that of providing a calibration method suitable for use with electropneumatic devices or systems. This calibration method is also suitable for resolving the problem of maintaining the braking precision of an electropneumatic braking system.

The aforesaid and other objects and advantages are achieved, according to an aspect of the invention, by a method for calibrating an acquisition chain of a braking device or braking system of at least one vehicle, in particular at least one railway vehicle, having the features defined in claim 1. Preferred embodiments of the invention are defined in the dependent claims, the content of which is to be understood as an integral part of the present description.

BRIEF DESCRIPTION OF THE DRAWINGS

The functional and structural features of some preferred embodiments of a method for calibrating an acquisition chain of a braking device or system of at least one vehicle, in particular at least one railway vehicle, according to the invention will now be described. Reference is made to the accompanying drawings, in which.

DETAILED DESCRIPTION

Figure 1:
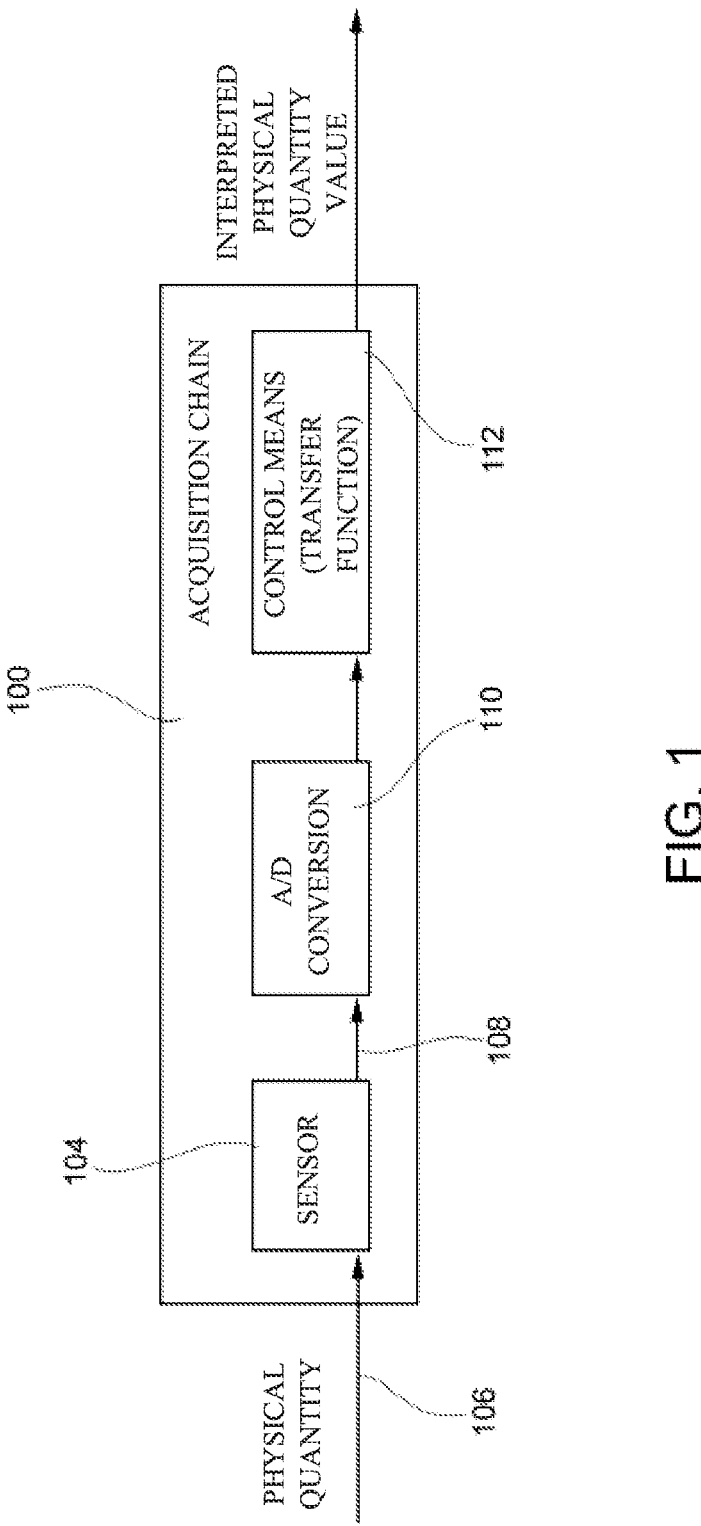
FIG. 1 shows an example acquisition chain.
Figure 2:
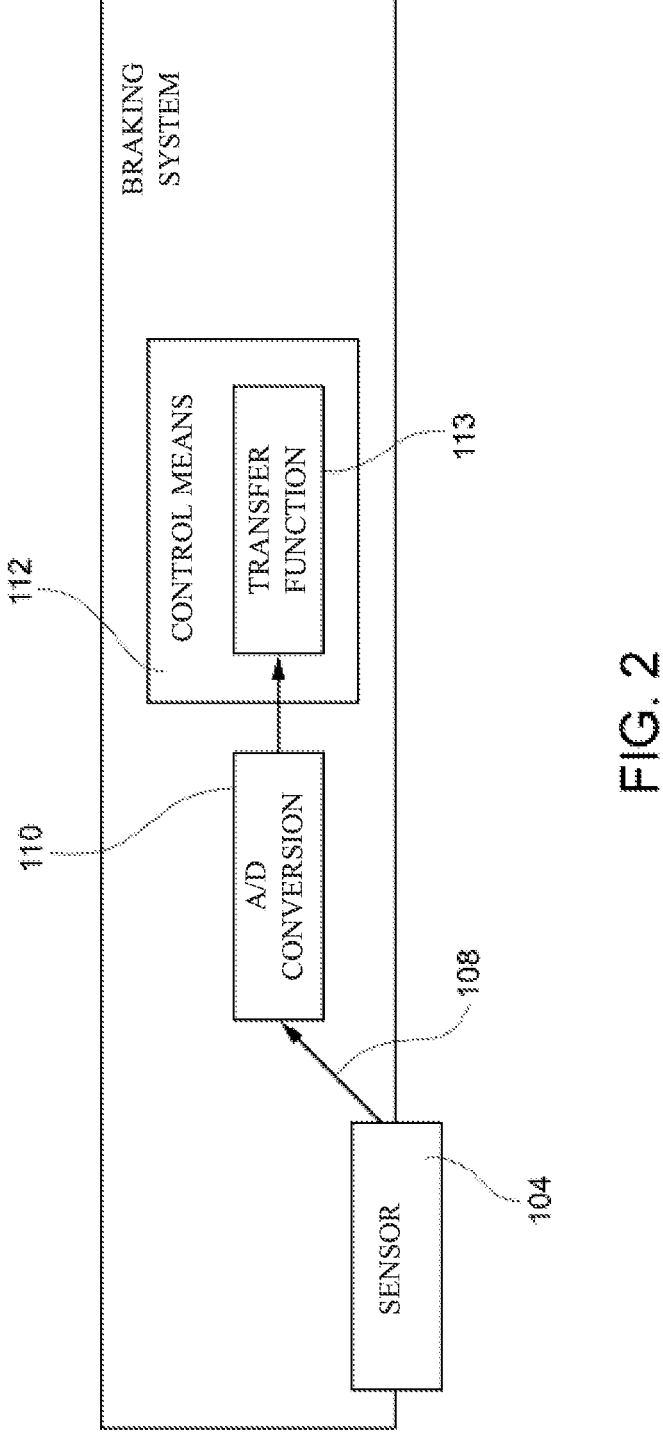
FIG. 2 shows an example braking system comprising said acquisition chain.

Before explaining in detail a plurality of embodiments of the invention, it should be clarified that the invention is not limited in its application to the design details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations is to be understood as encompassing the elements set out below and their equivalents, as well as additional elements and the equivalents thereof.

With initial reference to FIG. 1, an acquisition chain 100 comprises:

- a sensor means 104 arranged to measure a value of a physical quantity 106 and to provide an analogue signal 108, the value of which is a function of the value of said physical quantity;
- an analogue-to-digital conversion means 110 arranged to convert said analogue signal into a digital signal;
- control means 112 arranged to determine the value of said physical quantity from said digital signal and according to a transfer function 113 including at least one coefficient.

For example, the control means may be or include at least one of a processor, a controller, an FPGA, a microcontroller, a microprocessor, or the like.

Clearly, the sensor means may have its own transfer function. The sensor means may provide the analogue signal on the basis of the value of said physical quantity and its own transfer function. The analogue-to-digital conversion means may also have its own transfer function. The analogue-to-digital conversion means may convert the analogue signal into a digital signal according to its own transfer function.

The acquisition chain 100 may be defined as all of the elements which, by means of measurement, allow a determined physical quantity to be interpreted. In other words, the acquisition chain may comprise a sensor, an electrical interface (the analogue/digital conversion means) and a software code (executed by the control means). Each element may have its own transfer function. For example, the transfer function of the sensor means converts the physical value into an analogue electrical signal, the transfer function of the electrical interface converts the analogue electrical signal into a digital signal, and a software code SW converts the digital signal into an interpreted physical value.

In a first embodiment, a calibration method according to this invention includes the steps of:

- a) measuring a predetermined reference value 116 of said physical quantity by means of a calibration means 114 having a degree of accuracy greater than a predetermined threshold;

- b) measuring said predetermined reference value of said physical quantity by means of said acquisition chain,
- c) determining a measurement error of the acquisition chain by comparing the value measured by the calibration means with the value measured by the acquisition chain;
- d) modifying the at least one coefficient of said transfer function of the control means of the acquisition chain, on the basis of said comparison of the value measured by the calibration means with the value measured by the acquisition chain, so that said measurement error of the acquisition chain is minimized or rendered null.

For example, if comparing the value measured by the calibration means with the value measured by the acquisition chain produces a difference within an acceptable deviation range, the calibration may be continued. Alternatively, if comparing the value measured by the calibration means with the value measured by the acquisition chain produces a difference outside the acceptable deviation range, the acquisition chain and a unit associated therewith may be put out of service, without the calibration method being performed. This acceptable deviation range may typically be based on a maximum annual error increase for the sensor means and the maximum annual deviation for the analogue/digital conversion means.

For example, but not exclusively, the comparison may comprise a subtraction operation between the value measured by the calibration means and the value measured by the acquisition chain, or vice versa.

Figure 3:
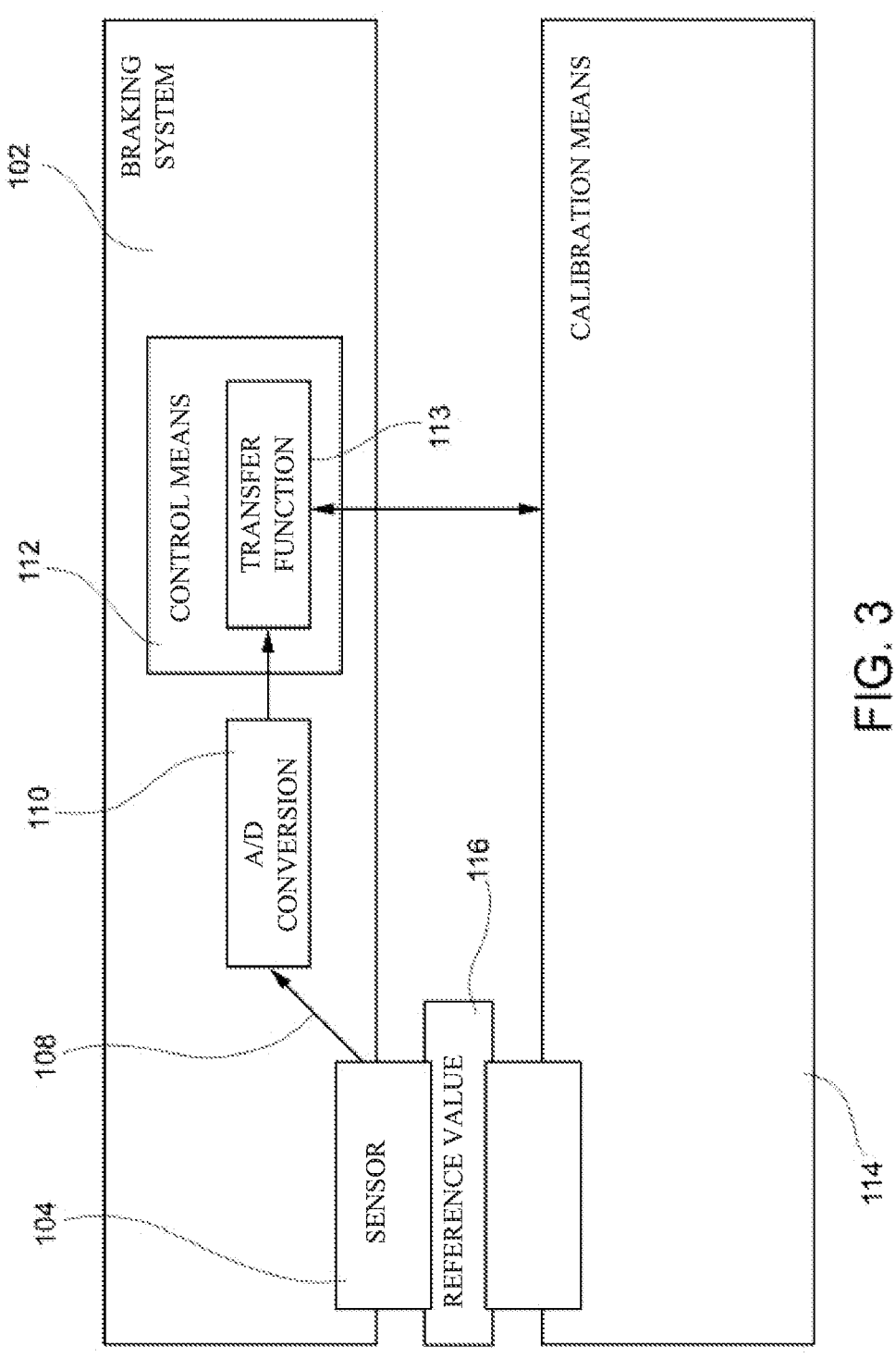
FIG. 3 shows an example set-up suitable for carrying out a method for calibrating an acquisition chain of a braking device or system of at least one vehicle, in particular at least one railway vehicle, according to this invention.

An example of calibration means is shown by way of example in the set-up of FIG. 3. The calibration means is a calibration system or device, for example. The calibration means may include therein a reproduction of the acquisition chain to be calibrated. The acquisition chain reproduced therein is capable of ensuring that the calibration means has a degree of accuracy greater than a predetermined threshold.

For example, the physical quantity may be a pressure. This pressure may be a pressure of a braking cylinder of an electropneumatic braking system, which cylinder is arranged to perform emergency and/or service braking, for example. In this case, the sensor means may be a pressure sensor. The same applies to other physical quantities. For example, if the physical quantity is a temperature, the sensor means may be a temperature sensor; if the physical quantity is a force, the sensor means may be a force sensor; if the physical quantity is a torque, the sensor means may be a torque sensor, etc.

Steps a) to d) may preferably be repeated for each acquisition chain of the at least one vehicle, in particular the at least one railway vehicle, that is arranged to measure a physical quantity associated with emergency braking. For example, if there are two vehicles, for example two railway vehicles, each having two braking cylinders arranged to perform emergency braking, steps a) to d) may be repeated four times for each of said braking cylinders.

Steps a) to d) may preferably be repeated for each acquisition chain of said at least one vehicle, in particular the at least one railway vehicle, that is arranged to measure a physical quantity associated with service braking. For example, if there are two vehicles, for example two railway vehicles, each having two braking cylinders arranged to perform service braking, steps a) to d) may be repeated four times for each of said braking cylinders.

The step of measuring the predetermined reference value of the physical quantity by means of the acquisition chain may also comprise the step of;

measuring said predetermined reference value of said physical quantity by means of a pressure sensor; or measuring said predetermined reference value of said physical quantity by means of a force sensor; or measuring said predetermined reference value of said physical quantity by means of a torque sensor; or measuring said predetermined reference value of said physical quantity by means of a speed sensor.

In other words, the sensor means of the acquisition chain may be or include at least a pressure sensor or a force sensor or a torque sensor or a speed sensor.

Steps a) to d) may preferably be performed during a production phase of said acquisition chain, before it is put into service. For example, the calibration method according to the invention may be used during the initial construction phase of the braking system of a vehicle, in particular at least one railway vehicle, including the acquisition chain, before it is put into service.

Steps a) to d) may preferably also be performed during a calibration phase of said acquisition chain of the braking system, after it is put into service. For example, the calibration method according to the invention may be used after the vehicle, in particular at least one railway vehicle, has been put into service, at times when it is necessary to perform a recalibration of the acquisition chain as a result of its drift.

The calibration method may preferably also comprise the steps of:

repeating said steps a) to d) for at least two environmental test conditions, so as to modify the at least one coefficient of said transfer function of the control means of the acquisition chain for a range of values of said environmental conditions.

The environmental conditions may preferably be two different temperature conditions.

The predetermined reference value of said physical quantity is preferably a value between a maximum value and a minimum value that may be measured by said sensor means.

Step d) may preferably also include the step of modifying the at least one coefficient of said transfer function of the control means of the acquisition chain, also according to interpretation parameters arranged to allow said digital signal to be interpreted.

The number of points used for the calibration may depend on the transfer function of the control means of the acquisition chain, during calibration, and on how it may deviate during its life cycle.

A one-point calibration makes it possible to compensate for an offset.

For linear transfer functions, a two-point calibration makes it possible to compensate for an offset and a gain deviation.

For non-linear functions, a multi-point calibration makes it possible to compensate for non-linear deviations.

Possible examples of use of this invention are described in the following.

Example 1—Use of the Interpretation Parameters

The following example is based on an "acquisition chain" with a linear transfer function. In this context, two points with coordinates (X, Y) are sufficient for describing the example.

In order to calculate the interpreted physical quantity, the software of the control means of the acquisition chain being tested may access interpretation parameters in order to allow the digital signal to be interpreted. These parameters may be present in an EEPROM or FLASH memory in order to ensure that the coefficients are available after shutdown.

The values selected for the default value of the interpretation parameters may be based on the datasheet of the sensor means.

The following table sets out the interpretation parameters for a given acquisition chain.

| Acquisition chain 1 | |
|---|---|
| X [mX] | Y [mY] |
| Xmin = 500 | Ymin = 0 |
| Xmax = 4500 | Ymax = 10000 |

The software of the control means may use the default interpretation parameters of the acquisition chain 1 in order to calculate the coefficients a and b of the linear equation (transfer function of the control means).

$$X_{min} \times a + b = Y_{min}$$

$$X_{max} \times a + b = Y_{max}$$

$$a = \frac{Y_{max} - Y_{min}}{X_{max} - X_{min}}$$

$$b = Y_{min} - X_{min} \times a$$

For an unknown value $X_n$ between $X_{min}$ and $X_{max}$, the coefficients a and b may be used to calculate the value of the interpreted physical quantity.

$$X_n \times a + b = Y_n$$

When calibration is carried out for a linear acquisition chain transfer function, two different reference values may be injected and read by the calibration means ($Y_1'$ and $Y_2'$). At the same time, the acquisition chain also carries out the measurement for the same two reference values, the sensor means generates an analogue signal for each of these, and the analogue signal is converted into digital signals ($X_1$ and $X_2$) which are read by the software of the control means.

The two different reference values do not necessarily have to be the minimum and maximum of the measuring capability of the sensor means, and in some circumstances it is not possible to reach these values on account of the surrounding device or system. In any case, for a linear function, two different values with a difference of at least 10% between the highest point and lowest point may allow the deviations to be corrected. The values of the physical quantity interpreted by the calibration means may then be substituted into the interpretation parameters, thus permanently erasing the preceding values in the EEPROM or FLASH memory. This operation corrects the physical quantity value interpreted by the acquisition chain being tested, making a match between the digital signal thereof and the value of the physical quantity, with the precision of the calibration means.

| Acquisition chain 1 | |
|---|---|
| X [mX] | Y [mY] |
| $X_1$ | $Y_1'$ |
| $X_2$ | $Y_2'$ |

This technique uses the capability of the calibration means to access the interpretation parameters inside the acquisition chain and calibrate the different acquisition chains.

The updated formula is as follows:

$$a' = \frac{Y_2' - Y_1'}{X_2 - X_1}$$

$$b' = Y_1' - X_1 \times a'$$

$$X_n \times a' + b' = Y_n$$

The supplier of the sensor means will usually specify an accuracy range for a certain temperature range in which the extreme temperature makes the sensor means less accurate. In order to counterbalance this effect, it is possible to use different interpretation parameters depending on the temperature.

The operating temperature range may be divided, for example, into three temperature ranges depending on the effective temperature, and a particular set of interpretation parameters is chosen.

As an alternative to using the interpretation parameters $((X_1, Y_1'), (X_2, Y_2'))$, it is possible to use the coefficients of the transfer function of the control means (a', b') to calibrate and store the updated information of the acquisition chain.

Example 2—Calibration Applied to a Braking System of a Railway Vehicle

Figure 4:
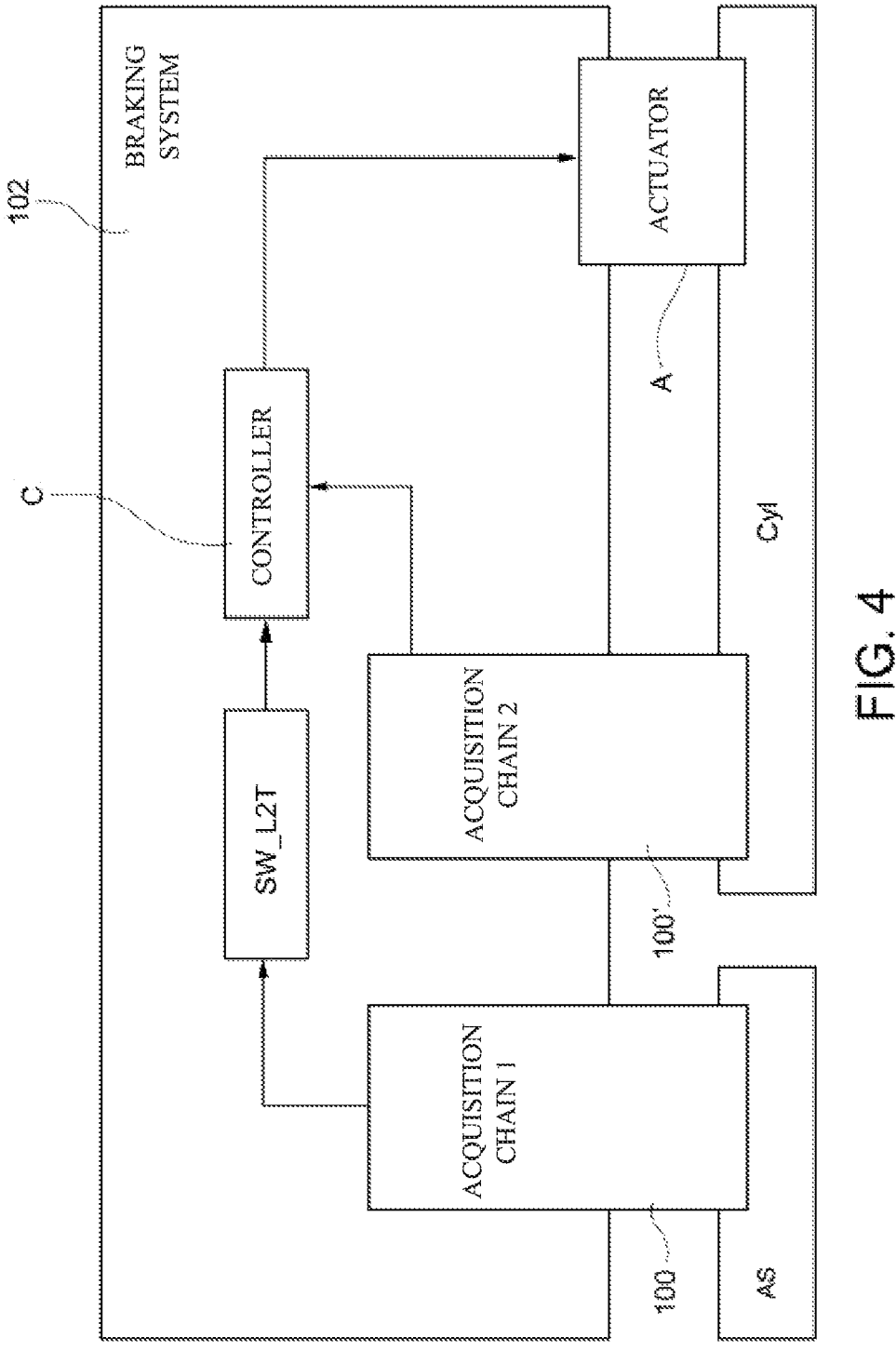
FIG. 4 shows an example electropneumatic braking device/system.

FIG. 4 shows an example electropneumatic braking device/system which carries out the service braking function.

This electropneumatic braking device/system may include:

air suspension (AS) pressure: represents the load on the railway vehicle;

pressure of the cylinder (Cyl): represents the force applied to an axle;

acquisition chain 1 (AC1): transfer function, pressure to interpreted pressure value;

acquisition chain 2 (AC2): transfer function, pressure to interpreted pressure value;

actuator (A): controls the pressure in the cylinder;

SW load pressure to the intended pressure of the cylinder (SW_L2T): transfer function from pressure to pressure;

controller (C): gives commands to the actuator, closed loop which minimizes the error between the intended pressure of the cylinder and the feedback of the pressure of the cylinder.

Figure 5:
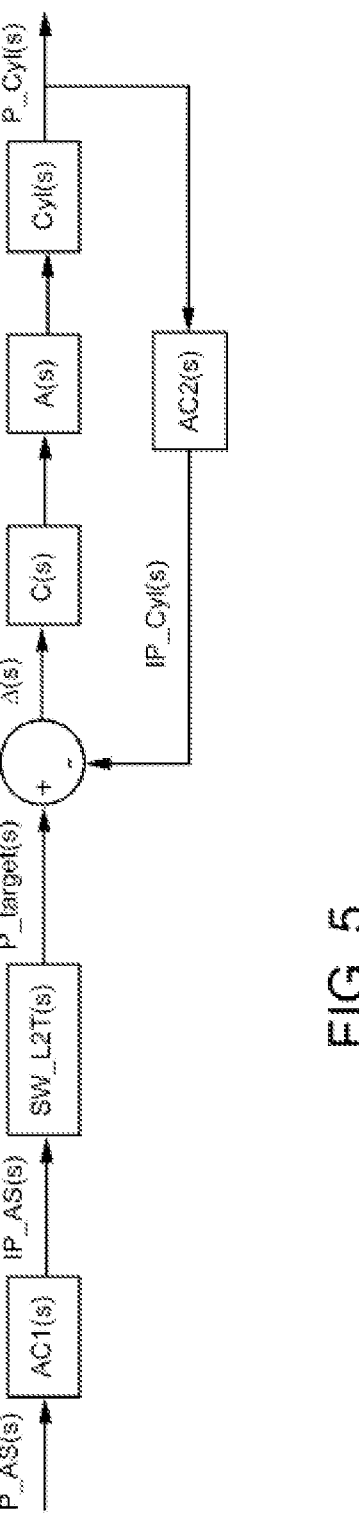
FIG. 5 shows a control block diagram which represents the electropneumatic braking device/system in FIG. 4.

FIG. 5 is a control block diagram which represents the braking device/system shown in FIG. 4.

Each control block has its own transfer function. For the purposes of this invention, only gray blocks are of interest.

AC1 represents the transfer function of the acquisition chain 1; its input is P_AS, which is the air suspension pressure, and its output is IP_AS, which is the interpreted air suspension pressure.

SW_L2T is the transfer function, i.e. load to intended pressure of the cylinder, and is dependent on the design since it depends on the type of vehicle suspension, the type of braking system, etc.

Its input is IP_AS, which is the interpreted air suspension pressure, and its output is P_target, which is the target pressure of the cylinder. The error originating from AC1 is modulated according to the transfer function SW_L2T.

AC2 represents the transfer function of the acquisition chain 2; its input is P_Cyl, which is the pressure of the cylinder, and its output is IP_Cyl, which is the interpreted pressure of the cylinder.

The output error of AC2 may then be "subtracted" from the error of SW_L2T, creating the output Δ which represents the difference between P_target (the intended pressure) and IP_Cyl (the interpreted pressure of the cylinder).

The input of the controller C may use a deadband around Δ of the difference. The deadband is shifted by the error which results from the subtraction. It is the controller which may send the commands to the actuators in order to control P_Cyl, which is the pressure of the cylinder.

The following table shows example data of the sensor means and of the control means, which data is used to calculate the service braking pressure error.

The full scale FS of the sensor is 10 bar.

| | Brake parameters | min | max |
|---|---|---|---|
| Design data | Acquisition chain error [% FS] | −0.525 | 0.525 |
| | Max offset 1 year [% FS] | −0.3 | 0.3 |
| | Deadband [mbar] | −50 | 50 |

These design data may be used to characterize the propagation of the error in the control block diagram shown in FIG. 5.

The following table shows the propagation of the error along the system when it leaves production. The resulting maximum error in the cylinder is +/−123.92 mbar.

| | Error propagation [mbar] | | | notes |
|---|---|---|---|---|
| New service brake | IP_AS [mbar] | −52.5 | 52.5 | Error AC1 |
| | P_target [mbar] | −21.42 | 21.42 | Target pressure with error AC1 |
| | IP_Cyl [mbar] | −52.5 | 52.5 | Error AC2 |
| | Delta [mbar] | −73.92 | 73.92 | Control input |
| | P_Cyl [mbar] | −123.92 | 123.92 | Pressure error in the cylinder with deadband control |

The following table shows the propagation of the error along the system after a year of service. The resulting maximum error in the cylinder is +/−166.16 mbar.

| | Error propagation [mbar] | | | |
|---|---|---|---|---|
| Service brake after 1 year | IP_AS [mbar] | −82.5 | 82.5 | Error AC1 |
| | P_target [mbar] | −33.66 | 33.66 | Target pressure with error AC1 |
| | IP_Cyl [mbar] | −82.5 | 82.5 | Error AC2 |
| | Delta [mbar] | −116.16 | 116.16 | Control input |
| | P_Cyl [mbar] | −166.16 | 166.16 | Pressure error in the cylinder with deadband control |

In both of the tables shown above, the single braking device/system, with components having characteristics defined in Table 3 would not meet the accuracy requirement of +/−100 mbar % in the cylinder.

By means of a calibration method according to this invention, the acquisition chain of the apparatus with which it is associated may be calibrated before being put into service.

This calibration increases the precision of the acquisition chain.

With the accuracy of the sensor means calibrated by a calibrated tool equal to +/−0.05 [FS], the resulting table of braking parameters is obtained:

| | Brake parameters | min | max |
|---|---|---|---|
| Design data | Acquisition chain error [% FS] | −0.05 | 0.05 |
| | Max offset 1 year [% FS] | −0.3 | 0.3 |
| | Deadband volume control [mbar] | −50 | 50 |

As shown above, the error in the resulting acquisition chain is equal to the accuracy of the calibrated acquisition chain.

The impact on the propagation of the error is shown below:

| | | Error propagation [mbar] | | notes |
|---|---|---|---|---|
| New | IP__AS [mbar] | −5 | 5 | Error AC1 |
| service | P_target [mbar] | −2.04 | 2.04 | Target pressure |
| brake | | | | with error AC1 |
| | IP__Cyl [mbar] | −5 | 5 | Error AC2 |
| | Delta [mbar] | −7.04 | 7.04 | Control input |
| | P__Cyl [mbar] | −57.04 | 57.04 | Pressure error in |
| | | | | the cylinder with |
| | | | | deadband control |

As may be seen above, the resulting maximum error at P_Cyl is +/−57.041 mbar, below the target of +/−100 mbar.

| | | Error propagation [mbar] | | |
|---|---|---|---|---|
| Service | IP__AS [mbar] | −35 | 35 | Error AC1 |
| brake | P_target [mbar] | −14.28 | 14.28 | Target pressure |
| after 1 | | | | with error AC1 |
| year | IP__Cyl [mbar] | −35 | 35 | Error AC2 |
| | Delta [mbar] | −49.28 | 49.28 | Control input |
| | P__Cyl [mbar] | −99.28 | 99.28 | Pressure error in |
| | | | | the cylinder with |
| | | | | deadband control |

In the table above, the resulting error at P_Cyl is +/−99.28 mbar, much closer to the target of +/−100 mbar, thus making annual calibration a necessity to guarantee accuracy in the brake cylinder.

The advantage achieved is therefore that of having provided a calibration method suitable for use with electro-pneumatic devices or systems.

A further advantage achieved is therefore that of having provided a calibration method suitable for resolving the problem of maintaining the braking precision of the electropneumatic braking system.

As described above, this invention may preferably be applied to at least one railway vehicle travelling on railway tracks. For example, a vehicle as referred to herein may be a locomotive or a carriage, and a course/route may include tracks on which the wheels of the locomotive roll. The embodiments described herein are not intended to be limited to vehicles on rails. For example, the vehicle may be a car, a truck (for example a highway semi-trailer truck, a mining truck, a truck for transporting timber or the like), a motorcycle or the like, and the route may be a road or a trail.

Various aspects and embodiments of a method for calibrating an acquisition chain of a braking device or system of at least one vehicle, in particular at least one railway vehicle, according to the invention have been described. It is understood that each embodiment may be combined with any other embodiment. Furthermore, the invention is not limited to the described embodiments, but may be varied within the scope defined by the appended claims.

The invention claimed is:

1. A method for calibrating an acquisition chain of a braking device or braking system of at least one vehicle, wherein the acquisition chain comprises:

a sensor means arranged to measure a value of a physical quantity and to provide an analogue signal, the value of which is a function of the value of said physical quantity;

an analogue-to-digital conversion means arranged to convert said analogue signal into a digital signal;

control means arranged to determine the value of said physical quantity from said digital signal and according to a transfer function including at least one coefficient; said calibration method including the steps of:

a) measuring, by means of a calibration means having a degree of accuracy greater than a predetermined threshold, a predetermined reference value of said physical quantity;

b) measuring, by means of said acquisition chain, said predetermined reference value of said physical quantity;

c) determining a measurement error of the acquisition chain by comparing the value measured by the calibration means with the value measured by the acquisition chain;

d) modifying the at least one coefficient of said transfer function of the control means of the acquisition chain, on the basis of said comparison of the value measured by the calibration means with the value measured by the acquisition chain, so that said measurement error of the acquisition chain is minimized or rendered null.

2. The calibration method according to claim 1, wherein steps a) to d) are repeated for each acquisition chain of said at least one vehicle that is arranged to measure a physical quantity associated with emergency braking, wherein the vehicle is a railway vehicle.

3. The calibration method according to claim 1, wherein steps a) to d) are repeated for each acquisition chain of said at least one vehicle that is arranged to measure a physical quantity associated with service braking.

4. The calibration method according to claim 1, wherein the step of measuring the predetermined reference value of said physical quantity by means of said acquisition chain further comprises the step of:

measuring said predetermined reference value of said physical quantity by means of a pressure sensor; or measuring said predetermined reference value of said physical quantity by means of a force sensor; or measuring said predetermined reference value of said physical quantity by means of a torque sensor; or measuring said predetermined reference value of said physical quantity by means of a speed sensor.

5. The calibration method according to claim 1, wherein said steps a) to d) are performed during a production phase of said acquisition chain, before it is put into service.

6. The calibration method according to claim 1, wherein said steps a) to d) are performed during a calibration phase of said acquisition chain, after it is put into service.

7. The calibration method according to claim 1, further comprising the steps of:

repeating said steps a) to d) for at least two environmental test conditions, so as to modify the at least one coefficient of said transfer function of the control means of the acquisition chain for a range of values of said environmental conditions.

8. The calibration method according to claim 7, wherein said at least two environmental conditions are two different temperature conditions.

9. The calibration method according to claim 1, wherein said predetermined reference value of said physical quantity is an average value between a maximum value and a minimum value that may be measured by said sensor means.

10. The calibration method according to claim 1, wherein said step d) further comprises the step of:

modifying the at least one coefficient of said transfer function of the control means of the acquisition chain, also according to interpretation parameters arranged to allow said digital signal to be interpreted.

11. A method for calibrating an acquisition chain of a braking device or braking system of at least one vehicle, wherein the acquisition chain comprises:

a sensor, the sensor being one or more of a pressure sensor, force sensor, speed sensor, and torque sensor, the sensor providing an analogue signal, the value of which is a function of a measured physical quantity, and an analogue-to-digital converter arranged to convert said analogue signal into a digital signal, the method comprising:

determining the value of said measured physical quantity from said digital signal and according to a transfer function including at least one coefficient;

measuring a first predetermined reference value of said physical quantity at a specified accuracy with a calibration device;

measuring said predetermined reference value of said physical quantity with the sensor;

determining a measurement error of the acquisition chain by comparing the value measured by the calibration device with the value measured by the acquisition chain with the sensor;

modifying the at least one coefficient of said transfer function on the basis of said comparison so that said measurement error of the acquisition chain is reduced.

12. The calibration method according to claim 11, wherein the vehicle is a railway vehicle.

13. The calibration method according to claim 12 wherein the method is performed during a production phase before the vehicle is put into service.

14. The calibration method according to claim 12 wherein the method is performed during a production phase.

* * * * *